(12) United States Patent
Huszak et al.

(10) Patent No.: US 12,143,287 B2
(45) Date of Patent: Nov. 12, 2024

(54) DETERMINATION OF A SEQUENCE OF BUS NODES IN A MULTI-DROP COMMUNICATION BUS

(71) Applicant: KONE Corporation, Helsinki (FI)

(72) Inventors: Gergely Huszak, Helsinki (FI); Ari Kattainen, Helsinki (FI); Mikko Vaskela, Helsinki (FI)

(73) Assignee: KONE CORPORATION, Helsinki (FI)

( * ) Notice: Subject to any disclaimer, the term of this patent is extended or adjusted under 35 U.S.C. 154(b) by 9 days.

(21) Appl. No.: 17/960,502

(22) Filed: Oct. 5, 2022

(65) Prior Publication Data

US 2023/0029130 A1 Jan. 26, 2023

Related U.S. Application Data

(63) Continuation of application No. PCT/FI2021/050306, filed on Apr. 22, 2021.

(30) Foreign Application Priority Data

| Apr. 30, 2020 | (EP) | 20172427 |
| Apr. 30, 2020 | (EP) | 20172445 |
| Sep. 24, 2020 | (EP) | 20198020 |

(51) Int. Cl.
*G06F 13/36* (2006.01)
*G06F 13/42* (2006.01)
(Continued)

(52) U.S. Cl.
CPC .......... *H04L 43/0864* (2013.01); *G06F 13/42* (2013.01); *H04L 12/40013* (2013.01)

(58) Field of Classification Search
None
See application file for complete search history.

(56) References Cited

U.S. PATENT DOCUMENTS 5,701,306 A * 12/1997 Arai .................... G06F 11/2733
714/724
6,594,284 B1 * 7/2003 Page ........................ G01V 1/22
713/401

(Continued)

FOREIGN PATENT DOCUMENTS

| CN | 104285190 A | 1/2015 |
| CN | 108156016 A | 6/2018 |

(Continued)

OTHER PUBLICATIONS www.wikipedia.com, Integrated Circuit, Oct. 2004, p. 1-9 (Year: 2004).*

(Continued)

*Primary Examiner* — Henry Tsai
*Assistant Examiner* — Dean Phan
(74) *Attorney, Agent, or Firm* — Birch, Stewart, Kolasch & Birch, LLP

(57) ABSTRACT

According to an aspect, there is provided a method for determining a sequence of bus nodes in a multi-drop communication bus. The method includes for each bus node: sending a request to the bus node using an bus node physical identifier to set the bus node to a loopback mode; transmitting at least one signal to the bus node via the multi-drop (Continued)

communication bus; receiving from the bus node a loopback signal caused by the at least one signal; and measuring a roundtrip delay between the at least one signal and the loopback response signal. The method further includes solving the physical order of the bus nodes in the multi-drop communication bus based on the roundtrip delays.

19 Claims, 3 Drawing Sheets

(51) Int. Cl.
*H04L 12/40* (2006.01)
*H04L 43/0864* (2022.01)

(56) References Cited

U.S. PATENT DOCUMENTS

| | | | | |
|---|---|---|---|---|
| 7,609,817 B1* | 10/2009 | Jones | ............ | H04M 1/24 |
| | | | | 379/22.01 |
| 7,746,883 B2 | 6/2010 | Erickson et al. | | |
| 2004/0098514 A1 | 5/2004 | Schuster | | |
| 2005/0030898 A1* | 2/2005 | Furlong | ............ | H04L 41/00 |
| | | | | 370/236 |
| 2010/0238812 A1 | 9/2010 | Boutros et al. | | |
| 2013/0129347 A1* | 5/2013 | Shin | ............ | H04B 10/0775 |
| | | | | 398/25 |
| 2013/0155877 A1* | 6/2013 | Boutros | ............ | H04L 45/50 |
| | | | | 370/249 |
| 2013/0254443 A1 | 9/2013 | Sixt | | |
| 2020/0153913 A1* | 5/2020 | Armistead | ............ | B66B 1/343 |

FOREIGN PATENT DOCUMENTS

| | | |
|---|---|---|
| JP | 10-186067 A | 7/1998 |
| JP | 2006-246462 A | 9/2006 |
| JP | 2013-505177 A | 2/2013 |
| WO | WO 2011/034527 A1 | 3/2011 |
| WO | WO 2013/147734 A1 | 10/2013 |

OTHER PUBLICATIONS

IEEE 802.3 SPMD 10SPE Multidrop Enhancements Study Group, Objectives for the Elevator/Escalator and Automotive Segments Topology Discovery (Ranging), IEEE Draft; HUSZAK_01A_SPMD_0120, IEEE-SA, Piscataway, NJ, vol. 802.3.SPMD;802.3da, Jan. 21, 2020, total 16 pages, https://www.ieee802.org/3/SPMD/public/jan20/Huszak_01_SPMD_0120.pdf.
International Search Report for PCT/FI2021/050306 (PCT/ISA/210) mailed on Jul. 14, 2021.
Written Opinion of the International Searching Authority for PCT/FI2021/050306 (PCT/ISA/237) mailed on Jul. 14, 2021.
English translation of the Japanese Office Action for Japanese Application No. 2022-565643, dated Jan. 30, 2024.
Chinese Office Action and Search Report for Chinese Application No. 202180031000.6, dated Mar. 28, 2024, with English translation.

* cited by examiner

DETERMINATION OF A SEQUENCE OF BUS NODES IN A MULTI-DROP COMMUNICATION BUS

CROSS REFERENCE TO RELATED APPLICATIONS

This application is a Continuation of PCT International Application No. PCT/FI2021/050306, filed on Apr. 22, 2021, which claims priority under 35 U.S.C. 119 (a) to Patent Application Nos. 20172427.5, filed in Europe on Apr. 30, 2020; 20172445.7, filed in Europe on Apr. 30, 2020; and 20198020.8, filed in Europe on Sep. 24, 2020, all of which are hereby expressly incorporated by reference into the present application.

TECHNICAL FIELD

The present application relates to the field of communication systems. More particularly, the present application relates to determining a sequence of bus nodes in a multi-drop communication bus.

BACKGROUND

When communication networks, for example, network utilizing multi-drop networks are set up, they need to be configured in order to function properly. These networks typically need some external means and/or information to be able to configure correctly. For example, multiple network nodes of the same kind would need manufacturing-time setup/configuration and/or hardware elements (such as jumpers, rotary switches etc.) to be able to identify their role/task in the network. If this needs to be performed manually, it makes is difficult, laborious and slow to configured networks comprising multiple network nodes. Further, even if the configuration of the network nodes could be established automatically, there is no knowledge how the network nodes are located in the network.

Thus, it would be beneficial to have a solution that would alleviate at least one of these drawbacks.

SUMMARY

According to a first aspect, a method for determining a sequence of bus nodes in a multi-drop communication bus is provided. The method comprises, for each bus node, sending a request to the bus node using a bus node physical identifier to set the bus node to a loopback mode, transmitting at least one signal to the bus node via the multi-drop communication bus, receiving from the bus node a loopback response signal caused by the at least one signal, and measuring a roundtrip delay between the at least one signal and the loopback response signal. The method further comprises solving the physical order of the bus nodes in the multi-drop communication bus based on the roundtrip delays.

In an implementation form of the first aspect, the bus node comprises a constant-delay loopback circuit. This may refer to a circuit having a predictable delay with very low jitter or variation, such that distance between the measuring node and the bus node can be determined for each bus node in a reliable manner based on the roundtrip delay. Latency as such is not an issue, as long as the delay is known.

In an implementation form of the first aspect, the constant-delay loopback circuit comprises an echo canceler and a re-transmitter. The use of the echo canceler enables to prevent a signal reflection from the bus node.

In an implementation form of the first aspect, the at least one signal may be a single pulse or a pulse pattern. The pulse pattern may comprise a fail detection signal or a code and/or it may be encoded or modulated, to improve reliability of the signal transmission.

In an implementation form of the first aspect, the at least one signal may be an analog signal, and the measuring node and the bus nodes may be provided with conversion interfaces for analog/digital signal conversions.

In an implementation form of the first aspect, the request comprises timing information associated with the loopback mode, the timing information indicating a duration of the loopback mode.

In an implementation form of the first aspect, the method further comprises solving the bus node physical identifier by: applying a physical identifier allocation strategy in which a segment coordinator uses an exclusive physical identifier and in which a special physical identifier is to be used by bus nodes detecting a usage condition, the special physical identifier being associated with a transmission opportunity; setting, by the segment coordinator, all bus nodes to a responsive state commanding them to reply a subsequent find request message; using, by the segment coordinator, at least one find request message to solve medium access control addresses of the bus nodes; querying, by the segment coordinator, physical identifiers of the bus nodes based on the medium access control addresses of the bus nodes; and assigning, by the segment coordinator, a unique physical identifier to each bus node.

In an implementation form of the first aspect, the multi-drop communication bus comprises a multi-drop ethernet bus.

According to a second aspect, there is provided an integrated circuit configured to perform the method of the first aspect.

According to a third aspect, there is provided an apparatus configured to perform the method of the first aspect.

According to a fourth aspect, there is provided an elevator system node configured to perform the method of the first aspect.

According to a fifth aspect, there is provided a method for solving a bus node physical identifier, the method comprising applying a physical identifier allocation strategy in which a segment coordinator uses an exclusive physical identifier and in which a special physical identifier is to be used by bus nodes detecting a usage condition, the special physical identifier being associated with a transmission opportunity; setting, by the segment coordinator, all bus nodes to a responsive state commanding them to reply a subsequent find request message; using, by the segment coordinator, at least one find request message to solve medium access control addresses of the bus nodes; querying, by the segment coordinator, physical identifiers of the bus nodes based on the medium access control addresses of the bus nodes;

and assigning, by the segment coordinator, a unique physical identifier to each bus node.

According to a sixth aspect, there is provided an integrated circuit configured to perform the method of the fifth aspect.

According to a seventh aspect, there is provided an apparatus configured to perform the method of the fifth aspect.

According to an eighth aspect, there is provided an elevator system node configured to perform the method of the fifth aspect.

According to a ninth aspect, there is provided a communication system comprising a multi-drop communication bus, at least one bus node communicatively connected to the multi-drop communication bus, and an apparatus of the seventh aspect communicatively connected to the multi-drop communication bus.

In an implementation form of the ninth aspect, the communication system comprises an elevator communication system.

According to a tenth aspect, an apparatus for determining a sequence of bus nodes in a multi-drop communication bus is provided. The apparatus comprises means for sending, for each bus node, a request using a bus node physical identifier to set the bus node to a loopback mode, means for transmitting at least one signal to the bus node via the multi-drop communication bus, means for receiving from the bus node a loopback response signal caused by the at least one signal, and means for measuring a roundtrip delay between the at least one signal and the loopback response signal. The apparatus further comprises means for solving the physical order of the bus nodes in the multi-drop communication bus based on the roundtrip delays.

In an implementation form of the tenth aspect, the bus node comprises a constant-delay loopback circuit. This may refer to a circuit having a predictable delay with very low jitter or variation, such that distance between the measuring node and the bus node can be determined for each bus node in a reliable manner based on the roundtrip delay. Latency as such is not an issue, as long as the delay is known.

In an implementation form of the tenth aspect, the constant-delay loopback circuit comprises an echo canceler and a re-transmitter. The use of the echo canceler enables to prevent a signal reflection from the bus node.

In an implementation form of the tenth aspect, the at least one signal may be a single pulse or a pulse pattern. The pulse pattern may comprise a fail detection signal or a code and/or it may be encoded or modulated, to improve reliability of the signal transmission.

In an implementation form of the tenth aspect, the at least one signal may be an analog signal, and the measuring node and the bus nodes may be provided with conversion interfaces for analog/digital signal conversions.

In an implementation form of the tenth aspect, the request comprises timing information associated with the loopback mode, the timing information indicating a duration of the loopback mode.

In an implementation form of the tenth aspect, the apparatus further comprises means for solving the bus node physical identifier by: applying a physical identifier allocation strategy in which a segment coordinator uses an exclusive physical identifier and in which a special physical identifier is to be used by bus nodes detecting a usage condition, the special physical identifier being associated with a transmission opportunity; setting, by the segment coordinator, all bus nodes to a responsive state commanding them to reply a subsequent find request message; using, by the segment coordinator, at least one find request message to solve medium access control addresses of the bus nodes; querying, by the segment coordinator, physical identifiers of the bus nodes based on the medium access control addresses of the bus nodes; and assigning, by the segment coordinator, a unique physical identifier to each bus node.

In an implementation form of the tenth aspect, the multi-drop communication bus comprises a multi-drop ethernet bus.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
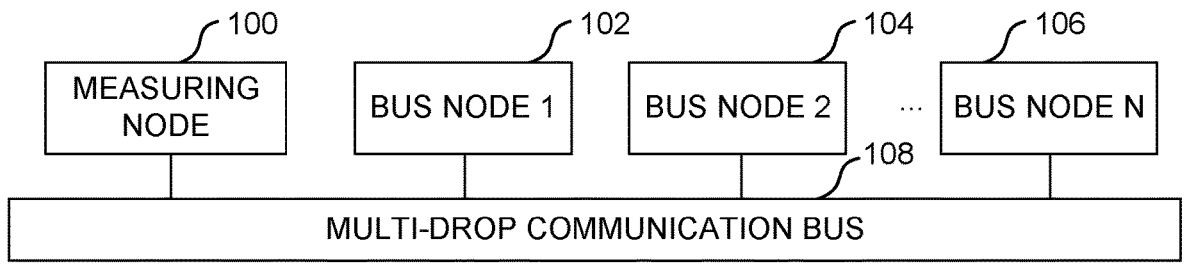
FIG. 1 illustrates a communication system according to an example embodiment.

FIG. 1 illustrates a communication system according to an example embodiment. The communication system comprises a multi-drop communication bus 108 and a plurality of bus nodes 100, 102, 104, 106. The bus node 100, 102, 104, 106 may comprise any device or a system element that is configured to communicate via the multi-drop communication bus 108. One of the bus nodes 100, 102, 104, 106 may act as a measuring node 100. The multi-drop communication bus may comprise, for example, a multi-drop ethernet bus. This is, however, one possible implementation of the multi-drop communication bus 108, and other implementations are also possible to be used.

The multi-drop ethernet bus 108 may comprise, for example, 10BASE-T1S multi-drop ethernet bus.

Figure 2:
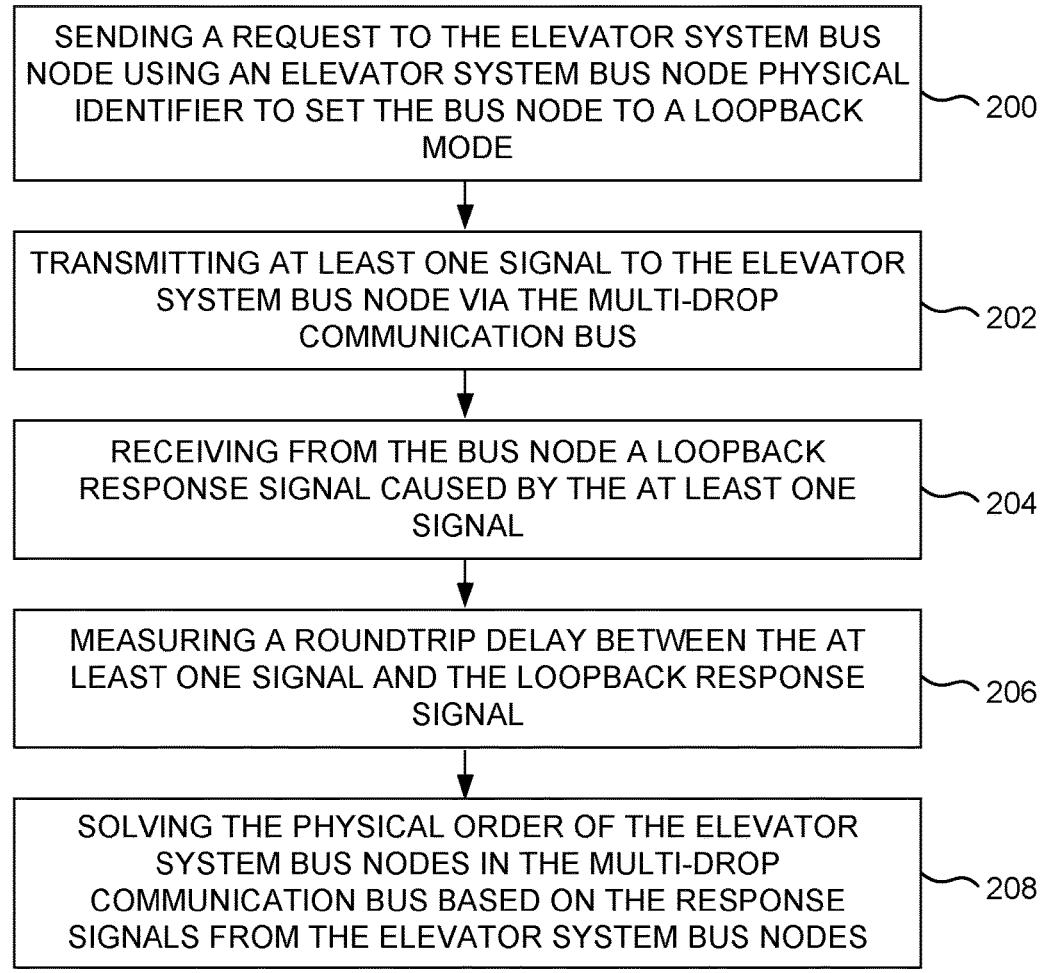
FIG. 2 illustrates a method for determining a sequence of bus nodes in a multi-drop communication bus according to an example embodiment.
Figure 3:
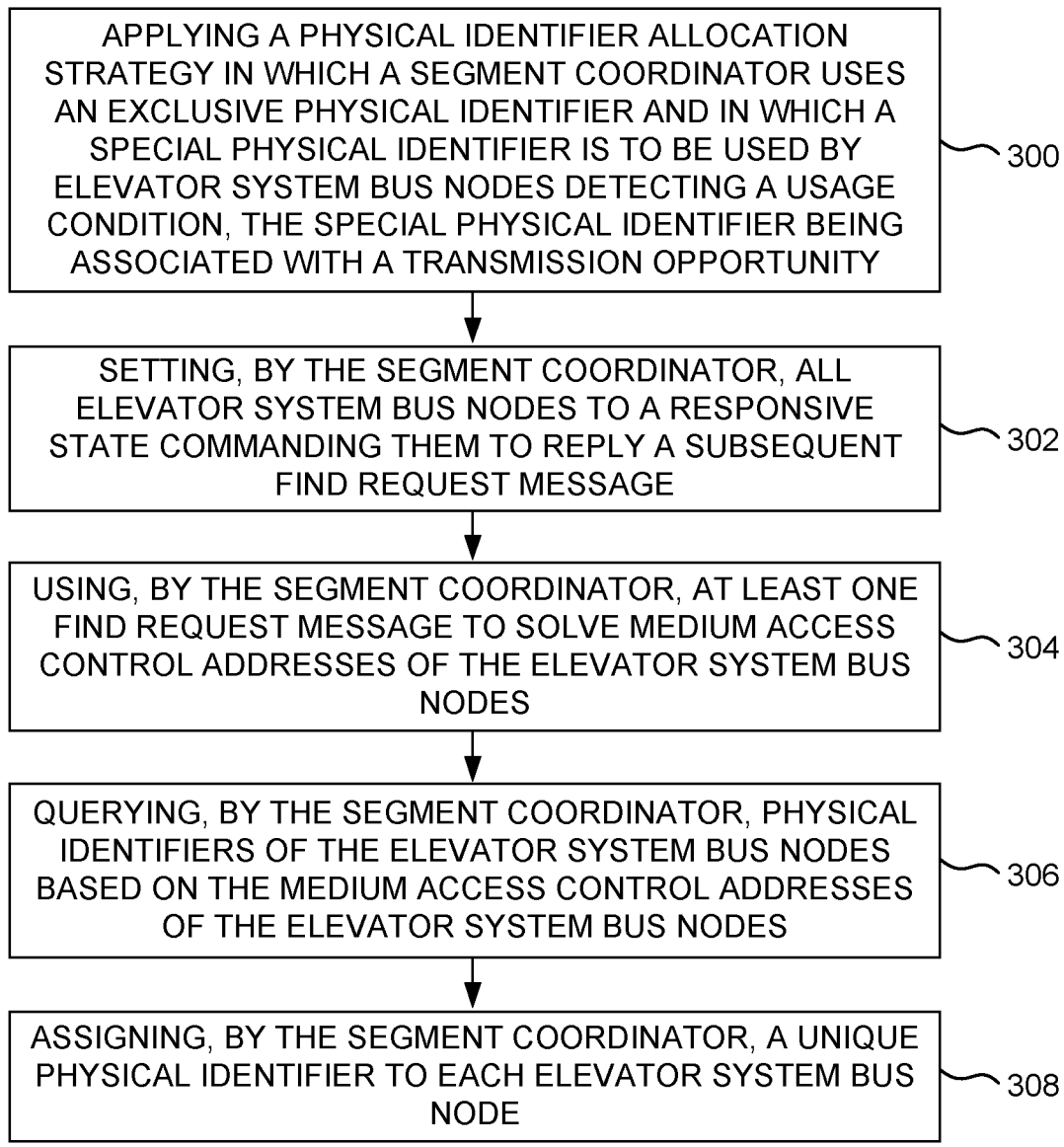
FIG. 3 illustrates a method for solving a bus node physical identifier according to an example embodiment.

The operation of the communication system is now discussed in more detail together with FIGS. 2 and 3.

FIG. 2 illustrates a method for determining a sequence of bus nodes 100, 102, 104, 106 in a multi-drop communication 108 bus according to an example embodiment. One of the bus nodes 100, 102, 104, 106 acts as a measuring node 100.

At 200, the measuring node 100 sends a request to a selected bus node, for example, the bus node 102, using a physical identifier of the bus node to set its network interface, for example, a medium-dependent interface (MDI) in the case of ethernet, to a loopback mode. The loopback mode may refer, for example, to a mode in which a loopback circuit of the network interface has known low-jitter delay characteristics. In an example embodiment, the request from the measuring node 100 may comprise timing information associated with the loopback mode, the timing information indicating duration of the loopback mode. In another example embodiment, the bus node 102 may time itself in accordance with a known pattern or timing. Further, in another example embodiment, the constant-delay loopback circuit may comprises an echo canceler and a re-transmitter. Further, impedance matching may be provided to prevent a signal reflection from the bus node.

The measuring node 100 may also set a detector method on the signal received from the bus nodes, i.e. for the loopback response signal. The measuring node 100 may also set an initial delay, before the expiration of which a detector will not trigger, even if conditions set up earlier are not met.

At 202 the measuring node 100 is configured to transmit at least one signal to the bus node 102 via the multi-drop communication bus 108. The at least one signal may comprise a single pulse or a specific pulse pattern. In addition to transmitting the at least one signal and if the initial delay was set, the measuring node 100 may be configured to start counting the initial delay. When the initial delay expires, the measuring node 100 will automatically start a timer. If the initial delay was not set earlier, the measuring node 100 starts the timer directly. The measuring node 100 may be configured to use a long delay line or some other comparable technique that can collect a number of samples of the reflected signal. When the timer is active, the long delay line is ready to capture a response signal. Alternatively or additionally, the measuring node 100 may use an ethernet transceiver of the physical layer (PHY) for sending and receiving signals.

At 204 the measuring node 100 is configured to receive from the bus node 102 at least one loopback response signal caused by the transmitted at least one signal. In an example embodiment, the measuring node 100 may be configured to command the long delay line to capture the reflected signal, i.e. the response signal.

At 206 the measuring node 100 is configured to measure a roundtrip delay between the at least one signal and the loopback response signal. In an example embodiment, the measuring node may start a timer when the at least one signal is sent to the node. An interruption may be generated in the measuring node when the loopback response signal is received, and the timer is stopped based on the interruption. The roundtrip delay/roundtrip time may then be determined based on the timer value. Alternatively, a peripheral hardware may generate a signal upon receipt of the loopback response signal for stopping the timer.

The steps 200, 202, 204 and 206 are repeated separately for each remaining bus node 104, 106.

At 208 the measuring node 100 is configured to solve the physical order of the bus nodes 102, 104, 106 in the multi-drop communication bus 108 based on the roundtrip delays. For example, the measuring node 100 may be configured to use the initial delay, timer and the content of the long delay line roundtrip time. Now the measuring node 100 has in its possession a vector of physical identifiers and their distances in time domain. The time domain may be mapped a spatial distance using any known solution enabling to achieve this.

Further, when the loopback circuit has a predictable delay with very low jitter or variation, the distance between the measuring node and the bus node can be determined for each bus node in a reliable manner based on the roundtrip delay. Latency as such is not an issue, as long as the delay is known. Further, in an example embodiment, the at least one signal sent by the measuring node 100 may comprise a digital message. This means that it may be possible to enhance reliability of the reliability of the physical order determination by applying, for example, a checking algorithm or correlation on the returning signals from the bus nodes.

In an example embodiment, statistical methods on repeated measurements may be used to improve accuracy and/or resolution. Error correction techniques applied to the signals may give additional reliability. Further, if the roundtrip time measurement relies on the exact wave propagation speed over the multi-drop communication bus, absolute distance measurements may require additional steps (such as calibrating cable type). An approximate or relative distance measurement would, however, still be possible (by assuming an average wave propagation speed, such as 6 ns/m). In an example embodiment, by properly selecting system parameters, the illustrated may be applied to find cable connection points (stubs, branches), discontinuities in the cable/harness or changes in previously known-good network conditions, due to aging, mechanical stress, increased connector resistance etc. Further, in networks that rely on IEEE 802.3 Clause 148, the test may be combined by the scheduling of the multi-drop communication bus segment coordinator's emission of beacon, this way avoiding collision with normal traffic and increasing the reliability of the system.

By using the above illustrated solution, the enumeration and monitoring of the network can be performed without a need for additional hardware on the bus nodes and without additional configuration at the time of manufacturing/installation or additional wire/wiring.

Further, by using the above illustrated solution, it may be not only possible to solve the order of the bus nodes, but also their relative and/or absolute distances, in time or space domain. This makes it possible to even determine a layout or a topology of the communication system by means of the inventive solution.

FIG. 3 illustrates a method for solving a physical identifier by of a bus node according to an example embodiment.

At 300 a physical identifier allocation strategy is applied in which a segment coordinator, for example, a measuring node 100, uses an exclusive physical identifier and in which a special physical identifier is to be used by the bus nodes 102, 104, 106 detecting a usage condition, the special physical identifier being associated with a transmission opportunity.

At 302, the segment coordinator sets all bus nodes 102, 104, 106 to a responsive state commanding them to reply a subsequent find request message.

At 304 the segment coordinator uses at least one find request message to solve medium access control addresses of the bus nodes 102, 104, 106.

At 306 the segment coordinator queries physical identifiers of the bus nodes 102, 104, 106 based on the medium access control addresses of the bus nodes 102, 104, 106.

At 308 the segment coordinator assigns a unique physical identifier to each bus node 102, 104, 106.

In an example embodiment, the steps 300-308 may involve three main components:
1. A physical identifier (PHY-ID) allocation/reservation strategy of the segment coordinator (SC). The SC may use PHY-ID 0.
2. PHY-ID usage strategy of the remaining (coordinated) nodes.
3. PHY-ID assignment method: This algorithm may be running in or on the top of the SC that allows enumerating any unconfigured node (UN) that is currently without a unique PHY-ID and allocating and then assigning PHY-IDs to those nodes.

In the physical identifier allocation/reservation strategy, PHY-ID #0 may be reserved for the exclusive use of the SC. The SC may reserve another special PHY-ID (SPID) to be used by any/all unconfigured nodes (UN). a transmit opportunity (TO) that belongs to this special PHY-ID (SPID) may be used by any (0-N) number of UNs. In practice, this may allow those nodes that all use the SPID to access the channel as if it was a regular (default) ethernet channel, where arbitration is dealt with by "first-come-first-served" strategy, while collisions are handled by a stochastic step-back- and retry approach (CSMA/CD). The SPID may have a constant value (for example, #1) or a variable value (for example, the number of known unique PHY-IDs plus one), depending on whether configuration of UNs should have priority over normal communication of regular nodes, or the other way around:

Method-A. When PHY-ID #1 is used, the configuration of UNs has precedence over regular packets, and the SC starts assigning unique PHY-IDs starting from #2.

Method-B. When a variable PHY-ID is used, regular packets have precedence over configuration of the UNs, and the SC starts assigning unique PHY-IDs starting from #1, but it may allow one extra TO for every PLCA cycle before emitting PLCA BEACON again.

Depending on local requirements, the SC may choose a mixed strategy, where, for example, after a power up, the Method-A may be used, until all nodes receive a unique PHY-ID. After this, the SC may switch to the Method-B or turns off the extra TO for some portion (0-100%) of the PLCA cycle. In an example embodiment, the SC may also maintain multiple SPIDs, to allow, for example, priority-based allocation of PHY-IDs.

In the PHY-ID usage strategy, when a bus node detects one of the following conditions (for example, after a reset), it will start using the well-known SPID to communicate normally:
- the bus node has no unique PHY-ID, i.e. the bus node is an unconfigured node (UN)
- the bus node has one, but a recurring/regular collision over the TO it belongs to is detected by it (which means the PHY-ID is not uniquely owned by the bus node, which can indicate a configuration error).

In the PHY-ID assignment method, the SC may maintain either its own algorithm to enumerate all nodes over a mixing segment, or it may permit higher-layer/host protocols to run their own algorithm that achieves this. Such an algorithm could be, for example, as follows):
- Using L2 broadcast/multicast addressing services, the SC may set all bus nodes to a "responsive" state, commanding them to answer to any subsequent find request (FR) messages. If the bus nodes are permitted to remember their PHY-ID (for example, via a local configuration database) or to have a locally configured PHY-ID (for example, via configuration pins, jumpers, rotary switches), the SC may need to have stretched PLCA cycles, up to the maximum allowed PHY-ID in the system (e.g. #255), to allow those pre-configured bus nodes to respond.
- Using L2 broadcast/multicast addressing services, the SC sends out a find request message or a sequence of those.
- The SC receives the first find answer (FA) which holds that bus node's MAC address. During this stage some/all of the bus nodes may be without a unique PHY-ID, thus using the SPID, as described above. Such a condition may cause a physical collision (as the TO belonging to that SPID is operating in the CSMA/CD mode) but that is expected and may be dealt with by standard normal stochastic processes.
- The SC commands the newly discovered node not to respond to subsequent find request message.
- The SC repeats these steps until none of the bus nodes sends a find answer message. The SC then makes the assumption that it holds a complete list of MAC addresses that are in use over the multi-drop bus segment.
- In an iterative manner, the SC queries the PHY-IDs of all the bus nodes using unicast addressing services, based on the nodes' previously collected MAC addresses.
- The SC may run an algorithm that lays out a continuous (hole-free) sequence of unique PHY-ID and assigns these to the nodes. This may be done so that the minimum number of PHY-ID reconfigurations (i.e. changes) needs to be done.
- The SC may send out network commands to the bus nodes that need a new PHY-ID based on their MAC addresses. These messages set the bus nodes to start using the new PHY-ID immediately.

When all nodes are gone through, the SC can run as a collision-less mixing segment with the PLCA.

The above illustrated solution may also be used to allocate any type of PHY-ID pattern to a bus segment. The method also not only configure unconfigured nodes, but also eliminate unintended PHY-ID collisions and unnecessary "holes" in the PHY-ID scheme that would either cause degradation of network performance or cause drop of network performance (respectively).

In an example embodiment, the functionality discussed above may be implemented, for example, by an integrated circuit.

Figure 4:
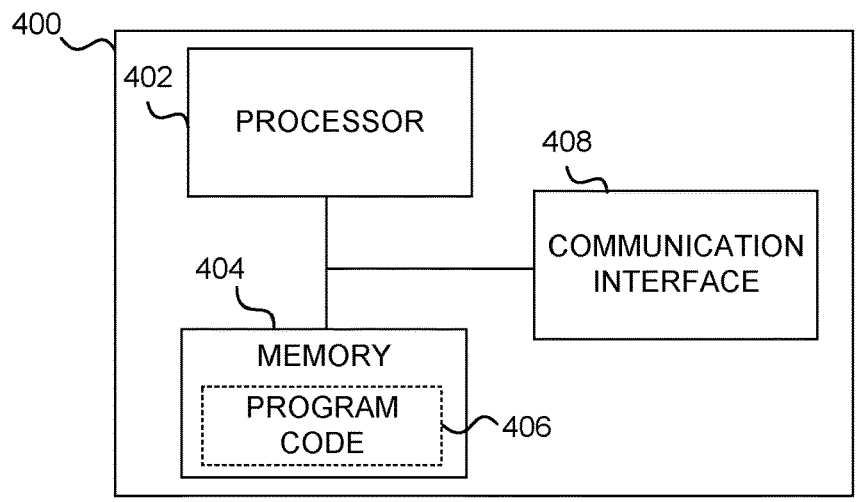
FIG. 4 illustrates an apparatus according to an example embodiment.

FIG. 4 illustrates an apparatus 400 according to an example embodiment. The apparatus 400 may comprise at least one processor 402. The apparatus 400 may further comprise at least one memory 404. The memory 404 may comprise program code 406 which, when executed by the processor 402 causes the apparatus 400 to perform at least one example embodiment discussed earlier. The exemplary embodiments and aspects of the subject-matter can be included within any suitable device capable of performing the processes of the exemplary embodiments. The exemplary embodiments may also store information relating to various processes described herein. Although the apparatus 400 is illustrated as a single device it is appreciated that, wherever applicable, functions of the apparatus 400 may be distributed to a plurality of devices. The apparatus 400 may comprise, for example, the measuring node 100 illustrated in FIG. 1.

Example embodiments may be implemented in software, hardware, application logic or a combination of software, hardware and application logic. The example embodiments can store information relating to various methods described herein. This information can be stored in one or more memories 404, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

The processor 402 may comprise one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments may be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories 404 for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

The apparatus 400 may comprise a communication interface 408 configured to enable the apparatus 400 to transmit and/or receive information, to/from other apparatuses, servers and/or clients.

The apparatus 400 may comprise means for performing at least one method described herein. In one example, the means may comprise the at least one processor 402, the at least one memory 404 including program code 406 configured to, when executed by the at least one processor 402, cause the apparatus 400 to perform discussed functionality.

Figure 5:
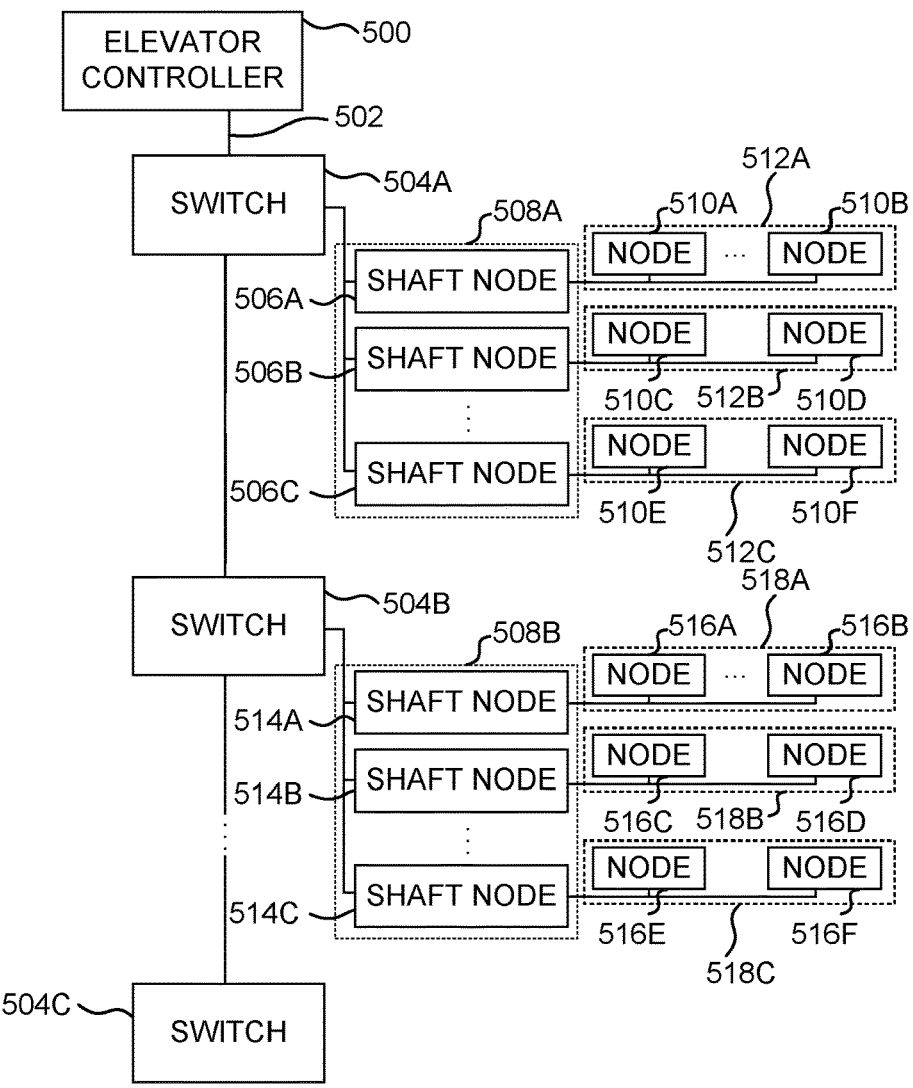
FIG. 5 illustrates an elevator communication system according to an example embodiment.

FIG. 5 illustrates an elevator communication system applying a multi-drop communication bus according to an example embodiment. The elevator communication system may employ the functionality discussed in relation to FIGS. 1-3.

The elevator communication system may comprise an elevator controller 500. The elevator communication system may further comprise one or more multi-drop bus segments 512A, 512B, 512C, 518A, 518B, 518C reachable by the elevator controller 500, and a plurality of elevator system nodes 506A, 506B, 506C, 510A-510F, 515A, 514B, 514C, 516A-516F configured to communicate via the multi-drop bus segments 512A, 512B, 512C, 518A, 518B, 518C wherein the elevator controller 500 is reachable by the elevator system nodes 506A, 506B, 506C, 510A-510F, 514A, 514B, 514C, 516A-516F via the multi-drop bus segments 512A, 512B, 512C, 518A, 518B, 518C. In an example embodiment, the multi-drop bus segment comprises a multi-drop ethernet bus segment.

In an example embodiment, the elevator communication system may comprise a point-to-point ethernet bus 502 and at least one connecting unit 504A, 504B, 504C comprising a first port connected to the multi-drop bus segment 508A, 508B and a second port connected to the point-to-point ethernet bus 502. Thus, by using the connecting units 504A, 504B, 504C one or more multi-drop bus segments 508A, 508B may be connected to the point-to-point ethernet bus 502. The connecting unit 504A, 504B, 504C may refer, for example, to a switch. Further, the point-to-point ethernet bus 502 may be connected to the elevator controller 500. The point-to-point ethernet bus 502 may be, for example, 100BASE-TX or 10BASET1L point-to-point ethernet bus. The multi-drop bus segments 508A, 508B, 512A, 512B, 512C, 518A, 518B, 518C may comprise, for example, 10BASE-T1S multi-drop ethernet bus.

In an example embodiment, an elevator system node 510A-510F, 516A-516F is configured to interface with at least one of an elevator fixture, an elevator sensor, an elevator safety device, and an elevator control device. Further, in an example embodiment, power to the nodes may be provided with the same cabling.

The elevator communication system may comprise an elevator safety controller. The elevator safety controller may be connected to the point-to-point ethernet bus 502 via a connecting unit. This means that the elevator system nodes 506A, 506B, 506C, 510A-510F, 514A, 514B, 514C, 516A-516F may send information to the elevator safety controller and vice versa via the common point-to-point ethernet bus 502. For example, the elevator system nodes 506A, 506B, 506C, 510A-510F, 514A, 514B, 514C, 516A-516F may send information, for example, from sensors or fixtures to the elevator controller 500 or the elevator safety controller and receive information therefrom to control, for example, actuators configure fixtures etc. At least some of the elevator system nodes 506A, 506B, 506C, 510A-510F, 514A, 514B, 514C, 516A-516F may be safety nodes in accordance with IEC61508 SIL level 3, having a safety processing unit and a separate communication controller. Data of the safety processing unit may be sent only to the elevator safety controller. The safety nodes may be configured to interface with elevator safety devices, such as safety sensors or safety contacts indicating elevator safety, e.g. landing door contacts, door lock contacts, contact of overspeed governor, buffer contacts etc. The safety nodes may be configured to communicate with the elevator safety controller. To establish safe communication, different kind of data checks, such as checksums, error detection and/or correction algorithms etc. may be used in the communication.

By implementing communication within the elevator communication system using at least one point-to-point ethernet bus and at least one multi-drop ethernet bus segment, various segments can be formed within the elevator communication system. For example, the elevator system nodes 510A, 510B may form a first landing segment, the elevator system nodes 510C, 510D may form a second landing segment, the elevator system nodes 510E, 510F may form a third landing segment, the shaft nodes 506A, 506B, 506C may form a first shaft segment, and the shaft nodes 514A, 514B, 514C may form a second shaft segment. Each of the segments may be implemented using separate multi-drop buses.

As illustrated in FIG. 5, the shaft nodes 506A, 506B, 506C, 514A, 514B, 514C interconnect the shaft segments 508A, 508B to which the shaft nodes 506A, 506B, 506C, 514A, 514B, 514C are connected to and landing segments 512A, 512B, 512C, 518A, 518B, 518C. In other words, the shaft nodes 506A, 506B, 506C, 514A, 514B, 514C may comprise or may act as a switch to the landing segments 512A, 512B, 512C, 518A, 518B, 518C. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

One or more of the plurality of elevator system nodes 506A, 506B, 506C, 510A-510F, 514A, 514B, 514C, 516A-516F may act as a measuring node 100 discussed earlier.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for determining a sequence of bus nodes in a multi-drop communication bus, the method comprising:
    for each bus node:
        sending a request to the bus node using a bus node physical identifier to set the bus node to a loopback mode;
        transmitting at least one signal to the bus node via the multi-drop communication bus;
        receiving from the bus node a loopback response signal caused by the at least one signal; and
        measuring a roundtrip delay between the at least one signal and the loopback response signal, and
    solving the physical order of the bus nodes in the multi-drop communication bus based on the roundtrip delays, wherein the method further comprises solving the bus node physical further comprising solving the bus node physical identifier by:
        applying a physical identifier allocation strategy in which a segment coordinator uses an exclusive physical identifier and in which a special physical identifier is to be used by bus nodes detecting a usage condition, the special physical identifier being associated with a transmission opportunity;
        setting, by the segment coordinator, all bus nodes to a responsive state commanding them to reply a subsequent find request message;
        using, by the segment coordinator, at least one find request message to solve medium access control addresses of the bus nodes;
        querying, by the segment coordinator, physical identifiers of the bus nodes based on the medium access control addresses of the bus nodes; and
        assigning, by the segment coordinator, a unique physical identifier to each bus node.

2. The method of claim 1, wherein the bus node comprises constant-delay loopback circuit.

3. The method of claim 2, wherein the constant-delay loopback circuit comprises an echo canceler and a re-transmitter.

4. The method of claim 1, wherein the at least one signal is a single pulse or a pulse pattern.

5. The method of claim 1, wherein the at least one signal is an analog signal.

6. The method of claim 1, wherein the request comprises timing information associated with the loopback mode, the timing information indicating a duration of the loopback mode.

7. The method of claim 1, wherein the multi-drop communication bus comprises a multi-drop ethernet bus.

8. The method of claim 2, wherein the at least one signal is a single pulse or a pulse pattern.

9. The method of claim 3, wherein the at least one signal is a single pulse or a pulse pattern.

10. The method of claim 2, wherein the at least one signal is an analog signal.

11. The method of claim 3, wherein the at least one signal is an analog signal.

12. The method of claim 4, wherein the at least one signal is an analog signal.

13. The method of claim 2, wherein the request comprises timing information associated with the loopback mode, the timing information indicating a duration of the loopback mode.

14. The method of claim 3, wherein the request comprises timing information associated with the loopback mode, the timing information indicating a duration of the loopback mode.

15. An integrated circuit comprises:
    a processor;
    a memory to store instructions, when executed by the processor, to perform the method of claim 1.

16. An apparatus comprises:
    a processor;
    a memory to store instructions, when executed by the processor, to perform the method of claim 1.

17. A communication system comprising:
    a multi-drop communication bus;
    at least one bus node communicatively connected to the multi-drop communication bus; and
    an apparatus of claim 16 communicatively connected to the multi-drop communication bus.

18. The communication system of claim 17, wherein the communication system comprises an elevator communication system.

19. An elevator system node comprises:
    a processor;
    a memory to store instructions, when executed by the processor, to perform the method of claim 1.

* * * * *